July 17, 1951 R. H. MURPHY 2,561,031
ELECTRICAL WIRING AND CONNECTION UNIT
Filed Sept. 26, 1947 2 Sheets-Sheet 1
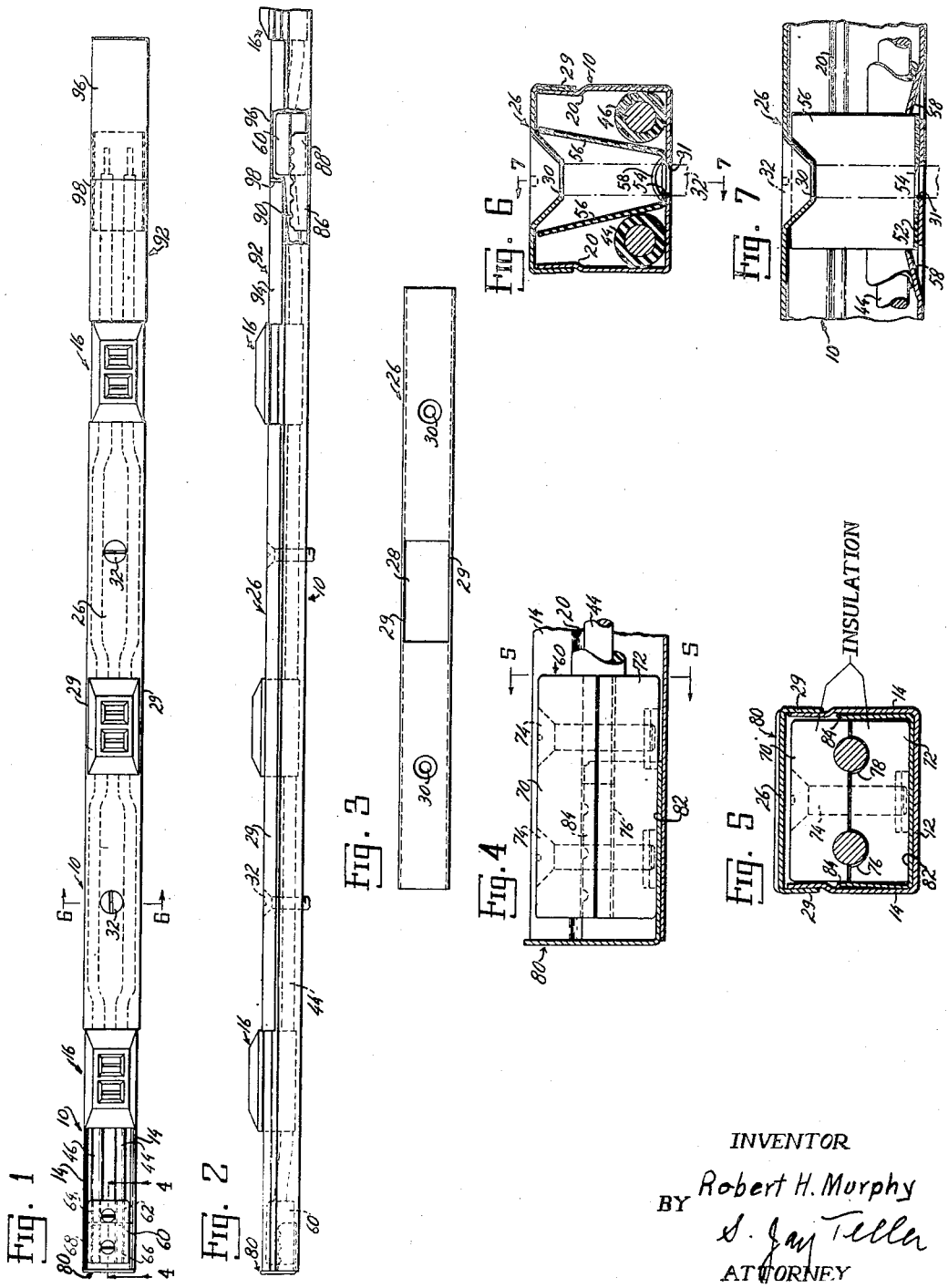
INVENTOR
Robert H. Murphy
BY
S. Jay Teller
ATTORNEY July 17, 1951 R. H. MURPHY 2,561,031
ELECTRICAL WIRING AND CONNECTION UNIT
Filed Sept. 26, 1947 2 Sheets-Sheet 2
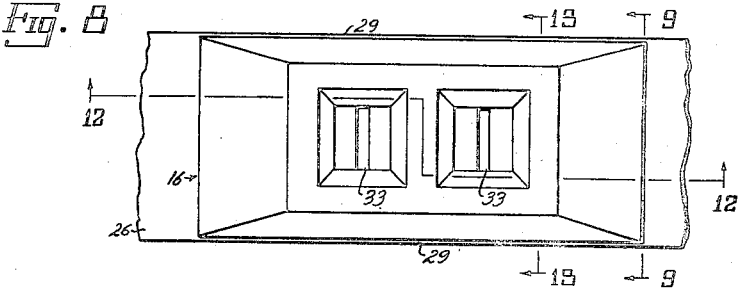
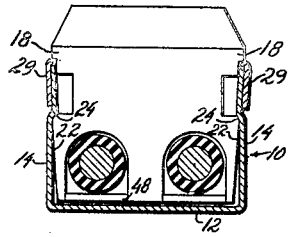
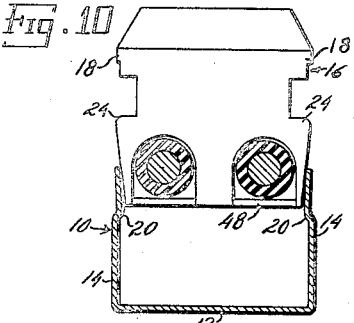
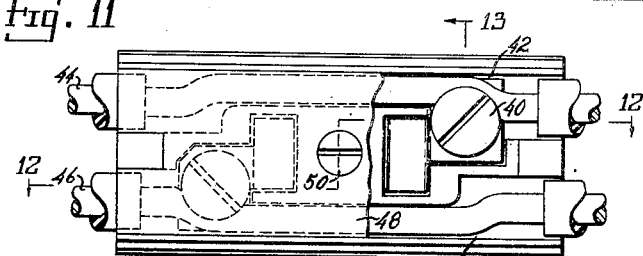
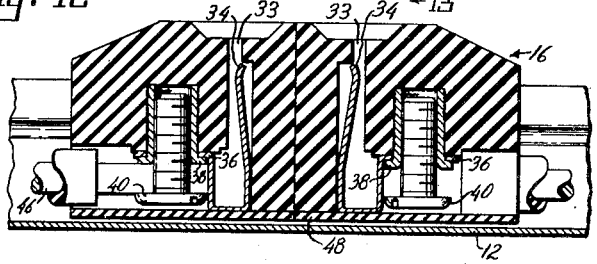
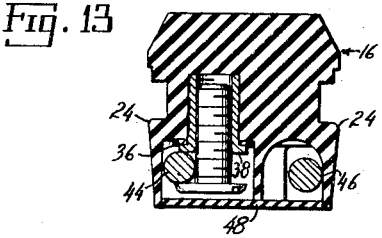
INVENTOR
BY Robert H. Murphy
S. Jay Teller
ATTORNEY Patented July 17, 1951

2,561,031

UNITED STATES PATENT OFFICE 2,561,031

ELECTRICAL WIRING AND CONNECTION UNIT

Robert H. Murphy, West Hartford, Conn., assignor to The Wiremold Company, Hartford, Conn., a corporation of Connecticut Application September 26, 1947, Serial No. 776,205

9 Claims. (Cl. 173—334.1)

The invention relates to an electrical connection device or unit comprising a longitudinal wire conduit with one or more plug receiving receptacles carried thereby and electrically connected with wires within the conduits.

One of the objects of the invention is to provide an improved interrelated construction for the conduit and for the body of the receptacle which enables the former to readily support and retain the latter. This improved construction makes it possible for the receptacle body to be engaged by the conduit and to be firmly held upon rearward movement of the body into the receptacle.

Another object of the invention is to provide a simple and inexpensive, but nevertheless effective, means for separating longitudinal wires within the conduit from a screw extending through the conduit and serving for attaching the unit to a supporting wall.

Still another object of the invention is to provide an improved conduit cover for use in a unit including three or more longitudinally spaced receptacles.

A still further object of the invention is to provide, as an article of manufacture, a factory assembled or preassembled unit including one or more receptacles in a conduit, together with the required wiring and the necessary means for electrically and mechanically connecting the unit with one or more similar units. In accordance with this phase of the invention one or more units having any desired number of receptacles or outlets can be readily and inexpensively installed, the installation involving only a minimum of time or effort.

Other objects of the invention will be apparent from the drawing and from the following specification and claims.

In the drawings I have shown in detail a preferred embodiment of the invention, but it will be understood that various changes may be made from the construction shown, and that the drawings are not to be construed as defining or limiting the scope of the invention, the claims forming a part of this specification being relied upon for that purpose.

Of the drawings:

Fig. 1 is a front view of an electrical connection device embodying the invention.

Fig. 2 is a side view of the device as shown in Fig. 1, this view also showing a part of an associated similar device.

Fig. 3 is a front view of the central cover of the device.

Fig. 4 is an enlarged longitudinal sectional view taken along the line 4—4 of Fig. 1.

Fig. 5 is a transverse sectional view taken along the line 5—5 of Fig. 4.

Fig. 6 is an enlarged transverse sectional view taken along the line 6—6 of Fig. 1.

Fig. 7 is a longitudinal sectional view taken along the line 7—7 of Fig. 6.

Fig. 8 is an enlarged front view of a portion of the device showing particularly one of the receptacles.

Fig. 9 is a transverse sectional view taken along the line 9—9 of Fig. 8.

Fig. 10 is a view somewhat similar to Fig. 9 but with the cover omitted and with the receptacle in the position which it occupies upon initial engagement with the conduit.

Fig. 11 is a rear view of a receptacle with a portion of the rear cover thereof broken away.

Fig. 12 is a longitudinal sectional view of the receptacle taken along the line 12—12 of Fig. 8 and along the line 12—12 of Fig. 11.

Fig. 13 is a transverse sectional view taken along the line 13—13 of Fig. 8 and along the line 13—13 of Fig. 11.

Referring to the drawing, 10 is an open-front longitudinal sheet metal conduit generally U-shaped in cross section. The conduit is formed by bending a longitudinal strip of metal and it has a rear wall 12 and side walls 14, 14. The side walls 14, 14 are in the main parallel with each other and perpendicular to the rear wall 12. The sheet metal constituting the conduit is preferably resilient for a purpose to be set forth.

Positioned at least partly within the conduit is at least one receptacle 16 adapted to receive and provide electrical contact with the prongs of a standard electrical connection plug. Under some circumstances only a single receptacle 16 may be provided, but a plurality of such receptacles is ordinarily preferred, the said receptacles being longitudinally spaced from each other and from the ends of the conduit 10. In accordance with one phase of the invention, it is necessary to provide at least three receptacles 16 and three receptacles are shown in the drawings. The spacing between the receptacles is preferably uniform, although this is not essential.

Each receptacle 16 has a main insulating body which is of such size and shape that a substantial portion thereof extends into the conduit and fits between the side walls 14, 14 thereof, as shown in Fig. 9. The body of the receptacle does not engage the rear wall of the conduit, and a substantial space is provided between the said body and the said rear wall. Another portion of the receptacle body is at the front of the conduit and this last mentioned portion has two opposite laterally projecting integral longitudinal extensions 18, 18 which are adapted to engage the front edges of the side walls 14, 14 so as to limit rearward movement of the receptacle relative to the conduit. Preferably, the lateral faces of the extensions 18, 18 are flush with the outer faces of the side walls 14, 14.

The front portions of the side walls 14, 14 of the conduit are offset toward the center to provide longitudinal rearward facing shoulders 20, 20, as shown in Figs. 6 and 10. The receptacle body is formed with laterally projecting integral longitudinal ribs 22, 22 which provide forward facing shoulders 24, 24. When the receptacle is in place, the forward facing shoulders 24, 24 on the ribs 22, 22 engage the rearward facing shoulders 20, 20 on the conduit side walls 14, 14 so as to prevent relative forward movement of the receptacle. The shoulders 20, 20 are so related to the front edges of the side walls that the receptacle is firmly held and cannot move either rearward or forward.

In order to facilitate assembly of the receptacle with the conduit, the portions of the walls of the latter at the front of the shoulders 20, 20 diverge slightly in the forward direction. The lateral walls of the ribs 22, 22 diverge in the forward direction, the transverse distance between the bottom edges of the said diverging walls being slightly less than the transverse distance between the top edges of the diverging front portions of the side walls 14, 14. During assembly the rear portion of the receptacle body is partly entered between the side walls 14, 14 of the conduit as shown in Fig. 10. Then the receptacle body is pushed rearward, the result being that the side walls 14, 14 are slightly separated to permit the shoulders 24, 24 to move past the shoulders 20, 20. Thereupon the side walls 14, 14, being resilient, snap inward to position the shoulders 20, 20 in front of the shoulders 24, 24 as shown in Fig. 9.

When there are two or more receptacles 16, 16 a means is provided for closing the front of the conduit between the receptacles, this means including at least one cover section. While a separate cover section may be provided between each two adjacent receptacles, it is preferred, when there are three or more receptacles, to povide a single one-piece cover 26 extending between the receptacles at the ends of the series. As shown in Fig. 3, the cover 26 has an aperture 28 therein adapted to receive and fit the forward projecting portion of the corresponding receptacle 16. Preferably, the cover 26 is formed of sheet metal with rearward extending flanges 29, 29 which engage the outer faces of the conduit side walls 14, 14. It will be seen that the aperture 28 extends entirely across the front of the cover 26, and that the portions of the cover at the opposite ends of the aperture 28 are connected with each other solely by the flanges 29, 29.

The flanges 29, 29 on the cover 26 converge slightly in the rearward direction and are adapted to engage the diverging front portions of the conduit side walls 14, 14 as shown in Fig. 5. This interengagement between the cover flanges and the side walls assists in holding the cover in place. With the cover in place, the flanges 29, 29 thereon prevent separation of the conduit side walls 14, 14.

Preferably the cover 26 is provided with one or more transversely central holes 30 which registers with transversely central holes 31 in the rear wall of the conduit as shown in Figs. 6 and 7. Each pair of holes is adapted for receiving a screw 32 which can enter a supporting wall for attaching the unit to the said wall.

The insulating body of the receptacle 16 has slots 33, 33 in the front thereof for receiving the prongs of a standard connection plug. Located in suitable recesses in the receptacle body behind the slots 33, 33, as shown in Fig. 12, are electrical contacts 34, 34 which are adapted to be engaged respectively by the prongs of the plug. An extension 36 on each contact 34 is apertured to receive a sleeve 38 which extends into a recess in the receptacle body. The interior of the sleeve 38 is threaded to receive a screw 40. Longitudinal grooves 42, 42 are formed in the bottom of the receptacle body near the sides thereof, these grooves respectively receiving conducting wires 44 and 46. The said wires 44 and 46 are insulated throughout the major portions thereof, but the insulation is removed from the portions thereof which extend through the receptacle. One screw 40 engages the bared portion of the wire 44 to electrically connect it with the corresponding contact 34, and the other screw 40 engages the bared portion of the wire 46 to electrically connect it with the other contact 34. A cover 48 of flat insulating material is provided for the rear of the receptacle, this cover being held in place on the receptacle body by a screw 50. The cover 48 can be removed to provide access to the screws 40, 40. It will be seen that the insulating cover 48 is spaced from the rear wall of the conduit and is interposed between the said rear wall and all electrically energized parts within the receptacle.

When there are two or more receptacles 16, 16 the same longitudinally extending wires 44 and 46 are electrically connected with the contacts 34, 34 of all of the receptacles. Between two receptacles the wires extend past the holes 30 and 31 for an attaching screw 32, and it is necessary, or at least desirable, to provide means for insuring the positioning of the wires at the sides of the conduit so that they cannot engage the screw. As shown in Figs. 6 and 7, the means provided for this purpose is a member 52 formed of insulating material, this member being U-shaped in transverse section and open at its ends. It may conveniently be a sheet of pressed fiber bent to the required shape. The back of the member 52 engages the rear wall 12 of the conduit and has a hole 54 registering with the hole 31. The legs 56, 56 of the member 52 extend forward with their front ends engaging or approximately engaging the cover 26. It will be seen that the legs 56, 56 are interposed between the respective wires 44 and 46 and the position of a screw 32 in the holes 30 and 31 and thus prevent the wires from engaging the screw. For holding the member 52 in place, the rear wall 12 of the conduit has integral lugs 58, 58 which are struck forward from the main body of the wall. The lugs 58, 58 are so spaced that the member 52 must be forced between during assembly, the lugs then firmly gripping and holding the member.

A connection device 60 is provided adjacent one end of the conduit, the said connection device having transverse dimensions less than those of the conduit. The connection device 60 is preferably positioned with at least a portion thereof within the conduit 10 and behind the front thereof. The connection device 60 preferably comprises at least one block of insulating material and carries at each end thereof two wire terminals, the terminals at the inner end being indicated at 62 and 64 in Fig. 1, and the terminals at the outer end being indicated at 66 and 68. The terminals at one end are electrically connected respectively with those at the other end, and as shown, the terminal 62 is connected with the terminal 66 and the terminal 64 is connected with the terminal 68. The several terminals are preferably of such form as to be adapted to engage wires which are straight, thus avoiding the necessity for looping the wires and attaining other advantages as hereinafter pointed out. The present invention is not limited as to the details of the connection device, but the connection device may advantageously be of the type disclosed in my copending application entitled Electrical Connection Device, Serial No. 776,204 filed September 26, 1947 and now abandoned. As shown in Figs. 4 and 5, the device 60 comprises upper and lower blocks 70 and 72 which are connected with each other by screws 74, 74. Carried in grooves in the lower block 72 are two partly-cylindrical strips 76 and 78 constituting electrical connecting members. The end portions of the strip 76 constitute the terminals 62 and 66, and the end portions of the strip 78 constitute the terminals 64 and 68. The upper block 70 has grooves registering with the grooves in the lower block 72. The ends of connection wires can be inserted in engagement with the end portions of the strips 76 and 78 and they can be held in firm engagement with the said strips by downward pressure exerted thereon by the upper block 70 and the screws 74, 74.

The before-mentioned wires 44 and 46 extend throughout substantially the length of the conduit 10. They are electrically connected as already described with the prong engaging contacts 34, 34 of each receptacle 16. The wires 44 and 46 are electrically connected at one end of the conduit with the inner terminals 62 and 64 on the connection device 60 as already described. The said wires 44 and 46 constitute the sole means for positioning the connection device and for preventing longitudinal movement thereof. The opposite end portions of the wires 44 and 46 are straight and are bared, as shown in Fig. 1, so as to be adapted to engage the outer terminals 66 and 68 on the connection device 60 of another similar unit placed with its conduit 10 aligning with and abutting against the conduit 10 of the first unit, as shown in Fig. 2.

Preferably the connection device 60 is spaced inward from the adjacent end of the conduit 10 sufficiently to permit a removable end closure to be placed in the end of the conduit. The closure as shown has a wall 80 which closes the end of the conduit, and it has a U-shaped retaining section with a rear wall 82 and side flanges 84, 84 which frictionally engage respectively with the rear wall and side walls of the conduit. The end closure is normally held in place frictionally, but it can be readily removed when the requirements of installation are such that the corresponding end of the conduit 10 must be open. The distance between the connection device 60 and the end closure is such that the outer ends of the electrical connecting members 76 and 78 are sufficiently separated from the end closure to provide the spacing necessary to meet safety requirements.

In order that the conduit 10 may be mechanically and electrically connected with the conduit of another similar unit, a metal connector 86 is provided which fits within the conduit 10 and projects from one end thereof. When an end closure is provided at the end of the conduit adjacent the connection device 60, the connector 86 is located at the opposite end of the conduit, but when no end closure is provided the connector 86 may be located at either end. The connector 86 is U-shaped in transverse section and it has a rear wall which engages the rear wall of the conduit and side walls 88, 88 which engage the side walls of the conduit. The side walls 88, 88 are preferably bent slightly outward at their front edges and are notched to provide teeth 90, 90 which engage the side walls of the conduit. The connector 86 snugly fits the conduit and it must be forced into place. Ordinarily, it is held in place solely by its frictional engagement with the conduit walls. The connector is located with one-half thereof within the conduit and with the other half thereof projecting so as to be adapted to enter and fit the conduit of another similar unit placed with its conduit aligning with and abutting against the conduit of the first unit.

As already explained, the front of the conduit between the receptacles 16, 16 is closed by one or more covers such as 26. For closing the front of the conduit between one end thereof and the nearest receptacle 16, there is provided a cover 92. This cover is preferably formed of sheet metal and it has rearward extending flanges 94 which engage the outer faces of the conduit side walls 14, 14. The flanges 94 preferably converge slightly in the rearward direction for the reasons already explained in connection with the flanges 29, 29 on the cover 26.

The cover 92 has a portion 96 which projects beyond the end of the conduit 10, and the projecting portion is of such length that it can close the front of the conduit of another similar unit between the adjacent end thereof and the nearest receptacle thereof when the last said unit is placed with its conduit aligning with and abutting against the conduit of the first unit.

In some installations there may not be any similar unit at the end of the conduit 10 which carries the cover 92. To meet this condition the cover 92 is transversely scored at 98, this scoring being in register with the end of the conduit. When the projecting portion 96 is not required for the purpose stated, it is broken off at the scoring 98. The portion 96 which is broken off is of the correct length to close the front of the conduit 10 at the opposite end and it may be so used.

In accordance with the invention, the electrical wiring and connection unit as shown in Fig. 1, or substantially as so shown, is assembled at the factory so as to reduce to a minimum not only the cost of initial assembly, but also the cost of final installation. The construction of the preassembled unit is such that it can readily and with a minimum of expense be connected with a similar unit or with several units constituting the complete installation. Each similar unit with which the first unit may be connected is not necessarily identical in construction therewith and may differ therefrom in various ways. The similar unit may have a different length or a different number of receptacles or different spacings between receptacles. In some instances the similar unit may be merely a conduit and the cover therefor, together with a connection device such as the device 60 and the necessary wires within the conduit. While the beforementioned similar unit may differ in various ways such as suggested, Fig. 2 shows a portion of a similar unit which is identical in construction with that shown in Fig. 1.

During installation, the first unit, as shown in Fig. 1, is placed on the supporting wall in proper position and is attached to the said wall by means of the screws 32, 32. The cover 92 is temporarily removed, the end closure of the similar or second unit is removed and discarded, and the screws 74, 74 of the connection device of the second unit are loosened. Then the second unit is pushed longitudinally into place with its conduit aligning with and abutting against the conduit of the first unit. As the second unit is moved into position, the connector 86 enters the conduit thereof so as to hold the end portions of the two conduits in alignment and so as to establish an electrical connection between them. Such electrical connection is necessary in order that the grounding of one section of conduit will serve for the grounding of all connected sections of conduit. At the same time the connection device 60 of the second unit passes over the bared straight ends of the wires 44 and 46 of the first unit, the wires being engaged with the outer end terminals 62 and 64 of the said connection device. Inasmuch as the wires are straight they are engaged with the terminals merely by relative endwise movement, it being unnecessary to remove and replace any screws or other parts as might be necessary if looped or bent wires were provided. The second unit is secured in place by means of screws such as 32, 32 and the screws 74, 74 of the connection device of the second unit are tightened to firmly engage the ends of the several wires with their respective terminals. Then the cover 92 is replaced so as to close the end of the conduit of the first unit, and to also close the adjacent end of the conduit of the second unit. The sequence of steps described may be repeated for each unit which is to constitute the series of units. While I have described the placement and connection of a unit at the right end of the first unit, it will be obvious that by similar steps of procedure one or more additional units may be connected at the left end of the first unit.

If it be assumed that all of the units are identical in construction, the projecting portion 96 of the cover 92 at the right end of the series is broken off and this portion 96 may be used to close the left end of the first unit, the said portion being of exactly the correct length for that purpose.

While I now prefer a unit as shown in Fig. 1, it will be apparent that the said unit may be varied in certain respects within the scope of the invention. In accordance with one variation, the end closure for the conduit may be omitted. When the end closure is omitted it is not essential that the connection device 60 be entirely within the conduit 10. It may be so located that it projects to some extent beyond the end of the conduit. Obviously, when the connection device 60 is located in a projecting position, the portions of the wires 44 and 46 at the opposite end are correspondingly shorter. Furthermore, when the end closure is omitted, the connector 86 may be located in the conduit at the same end thereof as the connection device 60. Alternatively, the connector 86 may be omitted from the unit and supplied as a separate part. The cover 92 may be initially carried at the left end of the conduit instead of at the right end thereof as shown. In fact, for convenience in shipping, the cover 92 may be initially separate from the other parts of the unit, being put in place after a second unit has been attached in proper position with respect to the first unit.

An installation including one or more units embodying the invention can be easily and inexpensively assembled and attached to a supporting wall. It is particularly well adapted for use in kitchens or work shops or other places wherein it is necessary or desirable to provide a series of closely spaced plug receiving receptacles.

What I claim is:

1. An electrical connection unit comprising in combination, an open-front longitudinal channel generally U-shaped in cross section and formed of resilient sheet metal, the front portions of the sides of the channel being offset toward the center to provide longitudinal rearward facing shoulders and the said front portions diverging at the front of the shoulders, a receptacle having an insulating body with slots in the front thereof and having contacts within the body adapted to be engaged by plug prongs inserted through the slots, the said receptacle body being movable rearward into the conduit for assembly, two laterally projecting integral longitudinal ribs at the sides of the receptacle body providing forward facing shoulders, the said ribs having side faces which diverge forward and which upon rearward movement of the body serve to engage the diverging front portions of the conduit side walls so as to separate the said side walls which thereafter spring back into normal positions with the rearward facing shoulders thereon engaging the forward facing shoulders on the ribs of the body to prevent relative forward movement of the body, two laterally projecting integral longitudinal extensions on the receptacle body near the front and adapted to engage the front edges of the conduit side walls to limit the said rearward movement of the body, and wire terminals on the receptacle body electrically connected with the said contacts therein.

2. In an electrical connection unit, the combination of an open-front longitudinal sheet metal conduit generally U-shaped in cross section and having a transversely central hole in its rear wall, two separate receptacles at least partly within the conduit and spaced longitudinally from each other and from the said hole, each receptacle having an insulating body with slots in the front thereof and having contacts within the body adapted to be engaged by plug prongs inserted through the slots, a front cover for the conduit between the receptacles having a transversely central hole registering with the said hole in the conduit wall so that a screw can be inserted through the holes for attaching the unit to a supporting wall, two flexible longitudinal wires in the conduit near the sides thereof which wires are electrically connected respectively with the contacts of the receptacles, a sheet insulating member in the conduit between the said receptacles and so bent that it is U-shaped in transverse section and open at its ends, the back of the said member being transversely central and engaging the rear wall of the conduit and having a mounting screw hole registering with the aforesaid holes and the legs of the said member approximately engaging the cover at their front ends and being between the respective longitudinal wires and the position of a screw in the said holes, and integral lugs struck forward from the rear wall of the conduit and engaging the edges of the insulating member to hold it in place.

3. As an article of manufacture, a preassembled electrical wiring and connection unit comprising in combination, an open-front longitudinal sheet metal conduit generally U-shaped in cross section, a plurality of separate receptacles at least partly within the conduit and spaced longitudinally from each other and from the ends of the conduit, each receptacle having an insulating body with a portion projecting from the front of the conduit which body has slots in the front thereof and each said receptacle having contacts within the body adapted to be engaged by plug prongs inserted through the slots, a single connection device adjacent one end of the conduit and having transverse dimensions less than those of the conduit, the said device having at each end two wire terminals with the terminals at one end electrically connected respectively with those at the other end, means including at least one cover section serving to close the front of the conduit at the end portions thereof and between the receptacle bodies, and two longitudinal wires within the conduit and electrically connected respectively with the inner terminals on the connection device and with the contacts of the several receptacles, the said wires being of such lengths that they can respectively engage the outer terminals of the connection device of another similar unit placed with its conduit aligning with and abutting against the conduit of the first unit.

4. As an article of manufacture, a preassembled electrical wiring and connection unit as set forth in claim 3, wherein the outer terminals on the connection device are adapted to engage straight longitudinal wires and wherein the portions of the said wires at the ends opposite the unit are straight and longitudinal so that the said wires can be engaged with the terminals on the connection device of another similar unit by relative longitudinal movement.

5. As an article of manufacture, a preassembled electrical wiring and connection unit comprising in combination, an open-front longitudinal sheet metal conduit generally U-shaped in cross section and having substantially parallel side walls, at least three separate receptacles at least partly within the conduit and projecting forward therefrom, the said receptacles being spaced longitudinally from each other and from the ends of the conduit and each receptacle having an insulating body with a portion projecting forward from the conduit which body has slots in the front thereof and each said receptacle having contacts within the body adapted to be engaged by plug prongs inserted through the slots, a single connection device adjacent one end of the conduit and having transverse dimensions less than those of the conduit, the said device having at each end two wire terminals with the terminals at one end electrically connected with those at the other end, a one-piece cover on the conduit having a front wall and also having two flanges at its sides extending throughout the length of the cover and respectively engaging the outer faces of the conduit side walls, the said cover having at least one opening in the front wall thereof within which the forward projecting portion of a receptacle body fits and the length of the cover being such that the front wall thereof closely fits the forward projecting portions of the bodies of two other receptacles, and two longitudinal wires within the conduit and electrically connected respectively with the inner terminals on the connection device and with the contacts of the several receptacles, the said wires being of such lengths that they can respectively engage the outer terminals of the connection device of another similar unit placed with its conduit aligning with and abutting against the conduit of the first unit.

6. As an article of manufacture, a preassembled electrical wiring and connection unit comprising in combination, an open-front longitudinal sheet metal conduit generally U-shaped in cross section, a plurality of separate receptacles at least partly within the conduit and spaced longitudinally from each other and from the ends of the conduit, each receptacle having an insulating body with a portion projecting from the front of the conduit which body has slots in the front thereof and each said receptacle having contacts within the body adapted to be engaged by plug prongs inserted through the slots, a single connection device adjacent one end of the conduit and positioned with at least a portion thereof within the conduit and behind the front thereof, the said device having at each end two wire terminals with the terminals at one end electrically connected respectively with those at the other end, means including at least one cover section serving to close the front of the conduit between the projecting portions of the receptacle bodies and at the ends thereof, two longitudinal wires within the conduit and electrically connected respectively with the inner terminals on the connection device and with the contacts of the several receptacles, the said wires being of such lengths that they can respectively engage the outer terminals of the connection device of another similar unit placed with its conduit aligning with and abutting against the conduit of the first unit, and a sheet metal connector U-shaped in cross section fitting within the conduit at ont end and projecting from the said end so as to be adapted to fit within the conduit of another similar unit placed with its conduit aligning with and abutting against the conduit of the first unit.

7. As an article of manufacture, a preassembled electrical wiring and connection unit comprising in combination, an open-front longitudinal sheet metal conduit generally U-shaped in cross section, a plurality of separate receptacles at least partly within the conduit and spaced longitudinally from each other and from the ends of the conduit, each receptacle having an insulating body with a portion projecting from the conduit which body has slots in the front thereof and each said receptacle having contacts within the body adapted to be engaged by plug prongs inserted through the slots, a single connection device adjacent one end of the conduit and positioned with at least a portion thereof within the conduit and behind the front thereof, the said device having at each end two wire terminals with the terminals at one end electrically connected respectively with those at the other end, two longitudinal wires within the conduit and electrically connected respectively with the inner terminals on the connection device and with the contacts of the several receptacles, the said wires being of such lengths that they can respectively engage the outer terminals of the connection device of another similar unit placed with its conduit aligning with and abutting against the conduit of the first unit, means including at least one cover section serving to close the front of the conduit between the projecting portions of the receptacle bodies, and a unitary end cover section of such length that it closes the front of the conduit between one end thereof and the nearest receptacle body and is adapted to also close the front of another similar unit between the adjacent end thereof and the nearest receptacle body thereof when the last said other unit is placed with its conduit aligning with and abutting against the conduit of the first unit.

8. As an article of manufacture, a preassembled wiring and connection unit as set forth in claim 7, wherein the end cover section is transversely scored at a position registering with the end of the conduit so that the portion of the said cover beyond the conduit may be broken off and used to close the front of the conduit between the opposite end thereof and the receptacle body nearest the said opposite end.

9. As an article of manufacture, a preassembled electrical wiring and connection unit comprising in combination, an open-front longitudinal sheet metal conduit generally U-shaped in cross section, the said conduit having a hole in its rear wall for receiving an attaching screw, a plurality of separate receptacles at least partly within the conduit and spaced longitudinally from each other and from the ends of the conduit, each receptacle having an insulating body with a portion projecting from the conduit which body has slots in the front thereof and each said receptacle having contacts within the body adapted to be engaged by plug prongs inserted through the slots, a single connection device adjacent one end of the conduit and positioned with at least a portion thereof within the conduit and behind the front thereof, the said device having at each end two wire terminals with the terminals at one end electrically connected respectively with those at the other end, means including at least one cover section serving to close the front of the conduit between the projecting portions of the receptacle bodies, the said cover having a hole therein registering with the hole in the rear wall of the conduit for receiving the said attaching screw, two flexible longitudinal wires within the conduit near the sides thereof and electrically connected respectively with the inner terminals on the connection device and with the contacts of the several receptacles, the said wires being of such lengths that they can respectively engage the outer terminals of the connection device of another similar unit placed with its conduit aligning with and abutting against the conduit of the first unit, and a sheet insulating member in the conduit between two of the said receptacles and so bent that it is U-shaped in cross section and open at its ends, the back of the said member being transversely central and engaging the rear wall of the conduit and having a hole registering with the aforesaid holes and the legs of the said member being between the respective longitudinal wires and the position of a screw in the said holes.

ROBERT H. MURPHY.

REFERENCES CITED

The following references are of record in the file of this patent:

UNITED STATES PATENTS

| Number | Name | Date |
|---|---|---|
| 1,945,731 | Cohen | Feb. 6, 1934 |
| 1,964,042 | DuBois | June 26, 1934 |
| 1,995,855 | Lee | Mar. 26, 1935 |
| 2,029,019 | Dorsey | Jan. 28, 1936 |
| 2,038,075 | Edwards | Apr. 21, 1936 |
| 2,112,753 | Abbott | Mar. 29, 1938 |
| 2,119,776 | Clayton | June 7, 1938 |
| 2,119,777 | Clayton | June 7, 1938 |
| 2,119,782 | Fullman | June 7, 1938 |
| 2,175,148 | Davison | Oct. 3, 1939 |
| 2,244,883 | La Ducer | June 10, 1941 |